Figure 1:
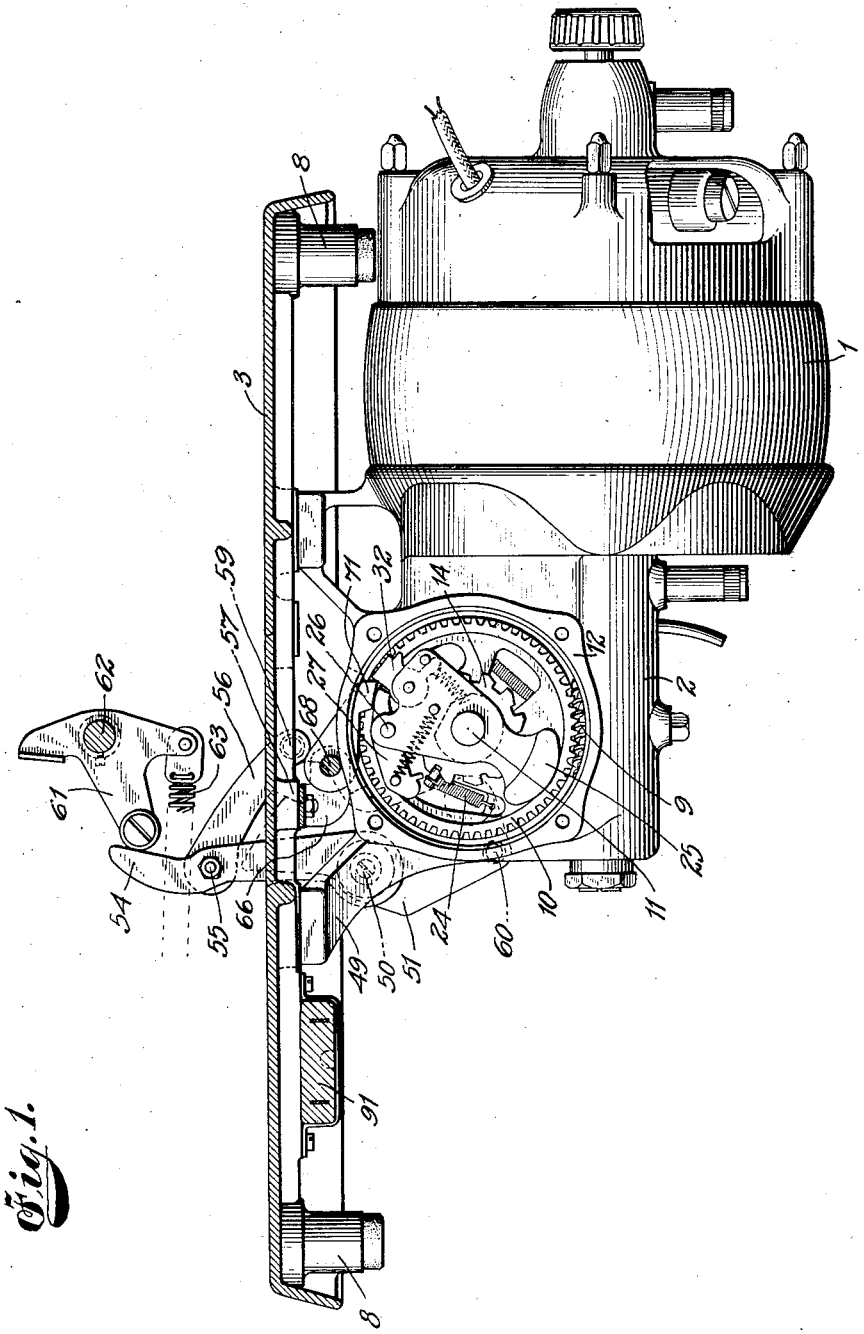

June 7, 1932.   N. WHITE   1,861,618
ELECTRIC DRIVE FOR ADDING MACHINES
Filed June 17, 1924    6 Sheets-Sheet 3

INVENTOR
Nelson White
BY
Ramsay Hogast
ATTORNEY

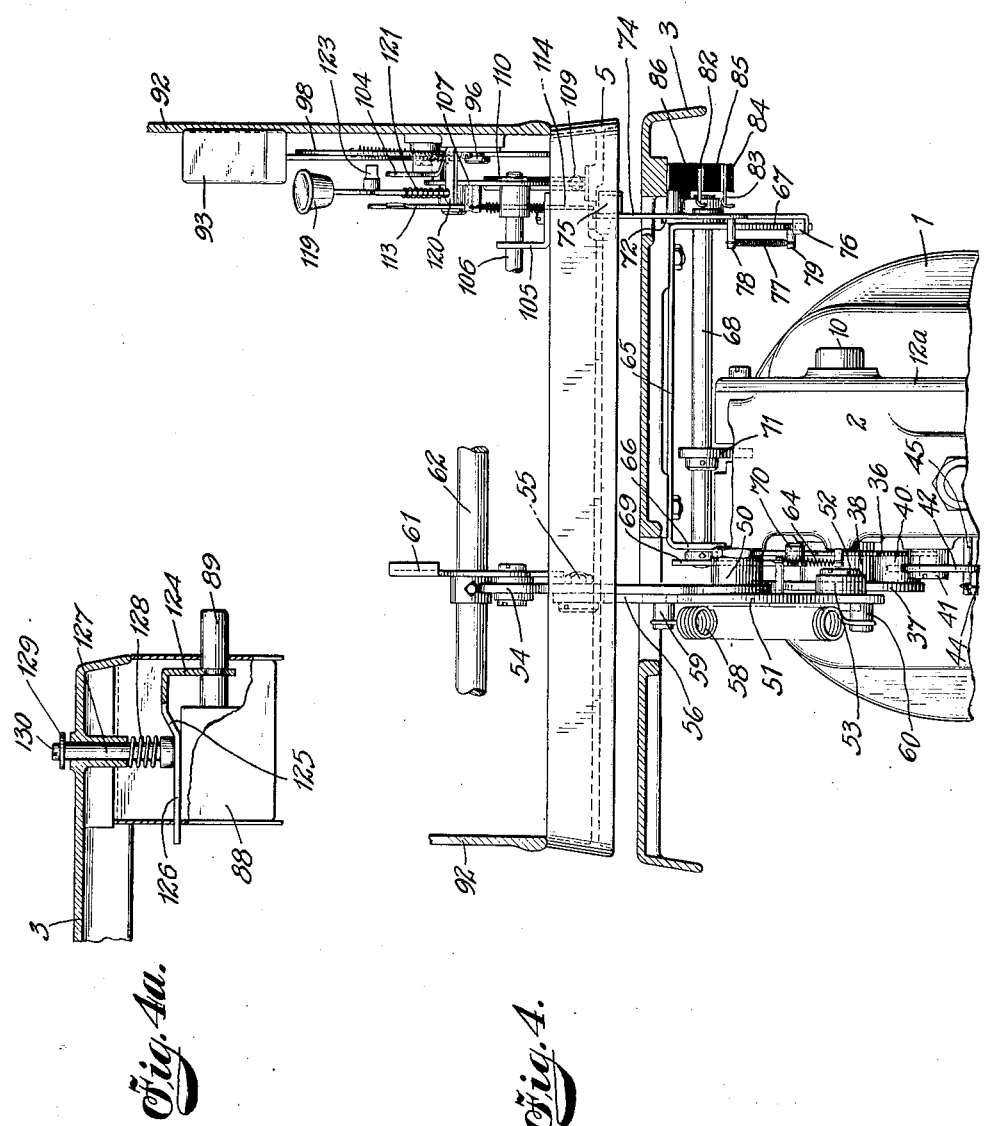

June 7, 1932.　　　　　N. WHITE　　　　　1,861,618

ELECTRIC DRIVE FOR ADDING MACHINES

Filed June 17, 1924　　6 Sheets-Sheet 5

Inventor
Nelson White

By his Attorney
Ramsay Hoguet

June 7, 1932.  N. WHITE  1,861,618
ELECTRIC DRIVE FOR ADDING MACHINES
Filed June 17, 1924  6 Sheets-Sheet 6
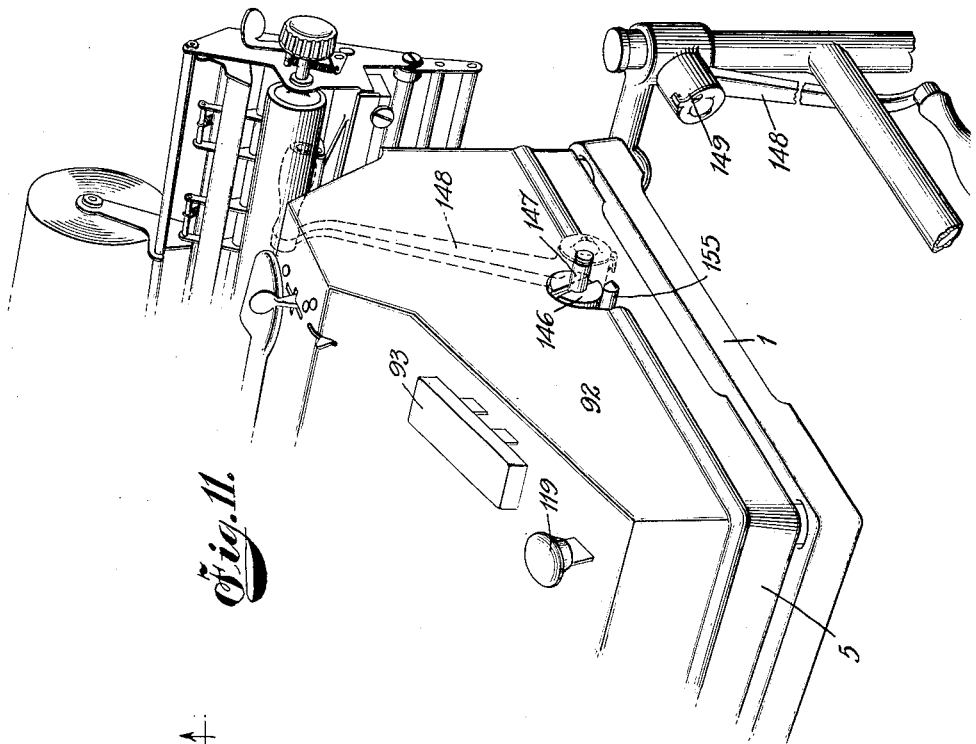
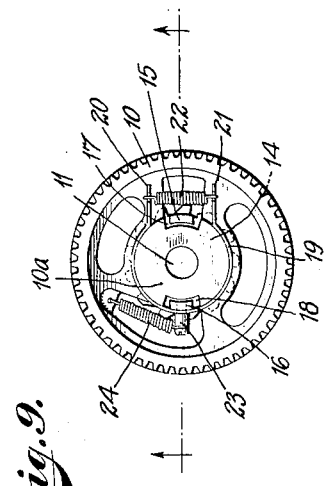
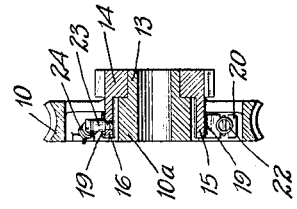
INVENTOR
*Nelson White*
BY
*Ramsay Hoguet*
ATTORNEY Patented June 7, 1932

1,861,618

UNITED STATES PATENT OFFICE

NELSON WHITE, OF ITHACA, NEW YORK, ASSIGNOR, BY MESNE ASSIGNMENTS, TO MORSE PRODUCTS, INC., OF ITHACA, NEW YORK, A CORPORATION OF NEW YORK

ELECTRIC DRIVE FOR ADDING MACHINES

Application filed June 17, 1924. Serial No. 720,602.

My invention relates in general to devices for power drive which may be associated with mechanisms of many types and where it may be desirable to use such a drive in place of manual operation. More particularly, I refer to a device for the driving of adding machines or the like and accomplish this by the use of an electric motor with appropriate controlling means and associated mechanisms to secure positive, smooth and effective operation. Other benefits and advantages will appear in the following specification and drawings which must be mutually considered and where like numbers refer to like parts throughout.

Figure 2:
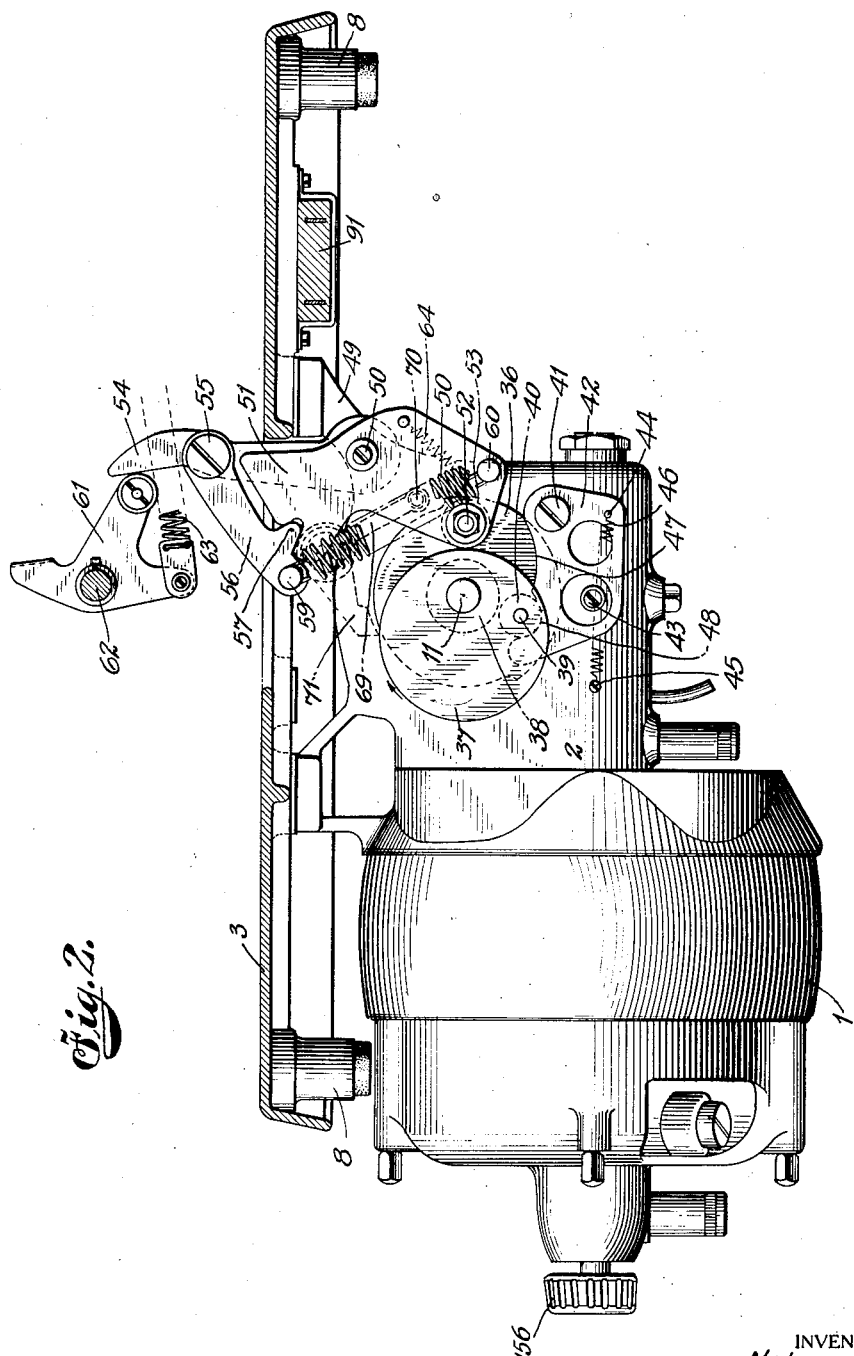
Figure 3:
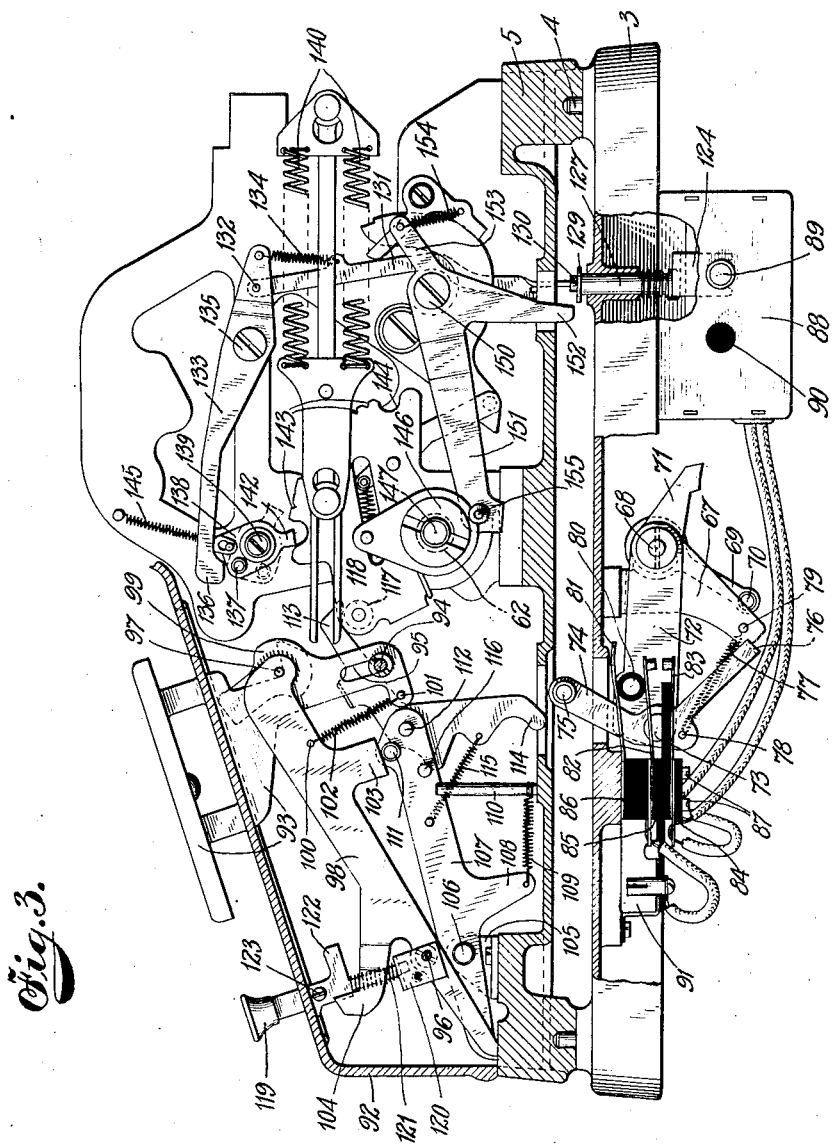

In the form which I have chosen to illustrate and describe my device, I show in the drawings in:

Fig. 1 a side elevation of the drive and sub-base looking from the right hand side and with the cover plate removed;

Fig. 2 a side elevation looking from the left hand side;

Fig. 3 a right hand elevation, partly in section, of parts associated with the sub-base and the adding machine;

Fig. 4 a front elevation of the drive, the sub-base and parts associated with the adding machine;

Fig. 4a a section through the motor starting box;

Figs. 5, 6, 7 and 8 the worm wheel assembly and associated parts in different positions;

Fig. 9 an elevation of the worm wheel clutch assembly;

Fig. 10 a section through Fig. 9 looking in the direction of the arrows; and

Fig. 11 a partial view of an end of the adding machine and supporting frame showing a method of holding the handle when not in use and a phantom view of the handle attached.

The preferred form of my invention as shown in the drawings includes a motor enclosed in a housing 1 which has an extension 2, both housing and extension being dependently fixed in a suitable manner to a sub-base 3. It is upon this sub-base that an adding machine, or the like, is securely placed when my electric drive is used in this connection as shown in Fig. 3, where I provide dowels or pins 4 which enter into the base 5 of the adding machine and retain it in a secure and correct position with relation to the driving mechanism mounted on the under side of the sub-base 3. This sub-base 3 has suitable supporting pieces 8, which carry the entire combination of machine and drive and which, in this instance, are adapted to rest upon a special table or the like as may be customary in such cases, as in Fig. 11.

The electric motor is mounted in the usual manner within the housing 1 and the shaft of this motor is connected to a second shaft journaled in the extension 2 and upon which is mounted or cut the worm 9. (See Fig. 1.) This worm 9 engages with the worm wheel 10 which is carried on the shaft 11, this shaft 11 being journaled in the extension 2 as indicated, one end being supported by a cover plate arranged to seat on the flange 12 and be held there by some means such as bolts or screws. This cover plate is shown at 12a in Fig. 4.

Loosely mounted on the shaft 11 and within the housing extension 2 is the worm wheel 10 engaging with the worm 9. (See Fig. 1). This worm wheel has assembled with it a clutch having a ratchet or toothed member 14 as shown particularly in Figs. 9 and 10. The hub 10a of the worm wheel 10 has a reduced portion 13 which forms a bearing for the toothed member 14 and this member 14 has two projecting lugs 15 and 16 which extend across the hub of wheel 10 through the cuts 17 and 18, which are made wider than the lugs 15 and 16 by a predetermined amount. Passing around and in contact with the hub 10a and the lug 16 is the friction piece 19, having extended ends 20 and 21 between which is mounted the tension spring 22. Passing through friction piece 19 and fixed in the lug 16 is a pin 23 which holds these two together and also holds one end of the tension spring 24, the other end being held in the wheel 10. Therefore, the friction piece 19 acts as a slip clutch between the worm wheel 10 and the toothed member 14 to which it is fixed, and it is evident that the worm wheel 10 will have a degree of movement with respect to the toothed member 14 before the lugs 15 and 16 contact with the sides of the cuts 17 and 18 to make the clutch relation positive. It is clear that this clutch arrangement serves to take up a load on the toothed member 14 gradually, not only against the friction mentioned, but also against the tension of the spring 24. This spring also serves to return the lugs 15 and 16 to the extreme side of the cuts 17 and 18 when the load on the toothed member 14 has been released.

As previously stated, the worm wheel assembly just described is loosely mounted on the shaft 11. I will now describe the assembly of this shaft and its driving connection with the worm wheel 10.

Fixed to the shaft 11 by a pin or in any desired manner is a weighted arm 25. (See Figs. 1, 5, 6, 7 and 8). This arm not only carries certain operating elements but is correctly balanced for rotation and partakes of the functions of a fly wheel. Movably fixed to the arm 25 by a pivot 26 is a clutch dog 27, designed to enter and engage with the teeth of member 14 of the worm wheel assembly. This dog 27 is held in engagement with these teeth by the tension spring 28 acting between pin 29 on the dog and pin 30 on the arm 25. Also movably pivoted on the arm 25 at 31 is a bent piece or catch 32 having an inward projection, not shown, and another projection 33. This piece 32 is limited in its movement about the pivot 31 by the pin 34 on the arm 25 and is normally held in the position with projection 33 against pin 34 by means of a compression spring 35 acting between this projection 33 and the arm 25 as shown. Therefore, the driving connection between the worm wheel 10 and the shaft 11 is through the clutch as described, to the toothed member 14, to the arm 25 by means of the dog 27, and to the shaft 11 upon which the arm 25 is fixed. These parts just described are all enclosed within the extension 2 of the motor housing 1 and are made accessible by the cover plate 12a which seats on the flange 12 of extension 2.

The shaft 11 extends outside the housing extension 2 on the opposite side from that shown in Fig. 1. (See Figs. 2 and 4). On this shaft and outside the housing extension 2 is mounted the drive cam assembly, this assembly being fixed to the shaft by a pin or other suitable means. This assembly comprises a cam 36 which operates the trip lever shaft to be described later and a drive cam 37 which operates the drive lever. These two cams are spaced apart and held in definite relation one to the other by the part 38 to which both cams are rigidly fixed. Also at a definitely predetermined point is a spindle, or the like, 39, upon which a roller 40 is placed between the cams 36 and 37.

Pivotally mounted on the housing extension 2 by the pivot 41 is drive cam detent 42, the movement of which is limited by the pin 43 which projects through a circular opening in the detent, as shown in Fig. 2. Held between the pin 44 on detent 42 and pin 45 on housing extension 2 is a tension spring 46 which holds the detent 42 in contact with the roller 40 of the drive cam assembly. Furthermore, this detent 42 has two curvatures; one as at 47, and the other as at 48, the latter being of approximately the same curvature as the roller 40.

The drive cam 37 relates to the drive lever assembly as follows: (see Figs. 1 and 2). On a supporting bracket 49 is a pivot 50 upon which is movably mounted the drive lever 51. On a lower corner of this lever is mounted a stud 52 upon which is a roller 53 and it is against this roller that the drive cam 37 works and a spring 64 holds the two in contact. On the same pivot 50 with the drive lever 51 is a yielding drive arm 54 upon which is a pivot 55 and on this pivot is movably fixed the drive lever safety dog 56 and this dog has a projection 57 which seats in a corresponding depression in the drive lever 51. The safety dog 56 and the drive lever 51 are held strongly together by a heavy tension spring 58 acting between the pin 59 on the safety dog and pin 60 on the drive arm. Therefore, the drive lever assembly as just described will move as a unit about the pivot 50 under the action of the drive cam 37. However, it will be noted that the projection 57 on the safety dog 56 and the corresponding depression in the drive arm 51 are so proportioned that the projection will ride out of the depression against the tension of the spring 58 if sufficient pressure is brought against the upper end of the yielding drive arm 54, as will be subsequently described.

Normally in contact with this upper end of the yielding drive arm 54 is the cam restoring lever 61 mounted on the operating shaft 62 of an adding machine, this restoring lever being connected to the main springs 63.

It is therefore clear that this restoring lever 61—and consequently the adding machine mechanism—is moved by the drive cam 37 rocking the drive lever assembly about the pivot 50 which, in turn, rocks the restoring lever 61 and the shaft 62 against the tension of the main springs 63.

The foregoing description has covered the drive mechanism and the relation between its component parts; the following will describe the control of this drive and the parts necessary therefor. These are shown principally in Figs. 1, 3 and 4.

Attached to the under side of the sub-base 3 in any approved manner is a bracket 65 having ends 66 and 67 in which are bearings for the trip lever shaft 68. One end 67 of the bracket 65 is longer than end 66 for a use to appear later. Fixedly attached to one end of this shaft is an arm 69 on the extremity of which is a roller 70. This arm 69 is directly in line with cam 36 (see also Fig. 2) and the roller 70 contacts with this cam to rock the shaft 68. Also fixedly mounted on shaft 68 and projecting downwardly into the housing extension 2 at a point over the clutch dog 27 of the drive mechanism is an intermediate arm 71. This arm 71 moves with the shaft 68 and in its uppermost position is clear of both the clutch dog 27 and the catch 32, but in its lowest position will contact with them both, as will be set forth when I consider the operation of my drive. On this same shaft 68 at the end opposite to the one on which is arm 69 is another arm 72, also rigidly mounted on the shaft. (See Fig. 3). On the outer end of arm 72 and movably pivoted at 73 is a latch 74. One end of this latch extends up through the sub-base 3 and has a roller 75 thereon. The other end extends downwardly and has a lip 76 thereon. This lip 76 is adapted to seat in a cut in the end 67 of bracket 65, as indicated in Figs. 3 and 4, and is held there by the tension of spring 77 acting between pin 78 on latch 74 and pin 79 on end 67 of the bracket. It will be seen that as long as lip 76 of latch 74 is seated as just described, neither arm 72 nor shaft 68 can move.

Also fixed on arm 72 is a stud 80 of non-conducting material. (Fig. 3.) This stud 80 serves to operate the switch controlling the current to the motor. This switch may be of any conventional design and in this instance consists of a flat spring 81 and two switch springs 82 and 83 having contact points at their outer ends, which are normally held apart or in the open position. The three springs just mentioned are separated by insulation 84, 85, and 86; both insulation and springs being attached to the sub-base 3 by screws 87 or the like. The insulated stud 80 on arm 72 is positioned between the flat spring 81 and the switch spring 82 and in contact with them. Spring 81 presses down on stud 80 and switch spring rests against it underneath. Consequently a downward movement of stud 80 will force switch spring 82 down on its mate 83 to make contact and these will spring apart as soon as stud 80 moves upwardly.

The electrical connections from the motor include a condenser 91 in the circuit as well as a starting box 88 which has the usual push buttons 89 and 90. These connections are such as are customarily employed according to the type of motor used and are well known. The starting box 88 also has a release and safety device to be explained in a subsequent part.

I have described the driving mechanism in the sub-base and the connected parts thereof, and will now pass to those members within the body of the adding machine which are related to this drive. See Figs. 3 and 4, which show portions of an adding machine having a base 5 and a cover shown partly in section at 92, this cover enclosing the working parts except for those usually exposed in this class of machine. On the face of the machine adjacent to the key board is a touch bar 93. This touch bar projects through openings in the cover 92 and, in this case, at a point near the right hand side. Fixed to the side of the cover is a pin 94 which is engaged in a cut 95 of touch bar 93 so that this touch bar is held in place and has a vertical movement equal to the length of the cut 95. Pivoted to the cover at 96 and to the touch bar at 97 is a yielding lever 98 having projections or extensions, as at 103 and 104. A degree of friction between this lever and the touch bar is provided by a flat spring 99 held by the common pin 97 so that a braking effect is secured and the operation made more uniform than would otherwise be the case. Between the pin 100 on the lever 98 and the pin 101 on the touch bar 93 is a tension spring 102. On the base 5 is a bracket 105 (Fig. 3) which journals a shaft 106 and mounted on this shaft is a trip control lever 107 having a projection 108 and a tension spring 109 is attached to this projection and to the pin 110 set in the base 5. This pin 110 is slotted for part of its length and forms a guide for the lever 107. It will be seen that the spring 109 tends to force lever 107 up so that pin 111 on this lever bears against projection 103 of lever 98. On the outer end of lever 107 is pivoted at 112 a bell crank having arms 113 and 114, as shown, and a tension spring 115 is held between this arm 114 and lever 107 so that the normal position of this arm is against the stop pin 116 on lever 107. Furthermore, the arm 113 of the bell crank finds a bearing on a roller stud 117 of the full stroke sector 118 of the adding machine mechanism. The effect of this will be seen in the description of the operation. Consequently, it is clear that a movement of the touch bar 93 will be transmitted to arm 114 of the bell crank through levers 98 and 107.

Near the touch bar 93 I show a correction key 119 projecting through the cover 92 and having one end slidably mounted in the clip 120 fixed to the side of the cover. This correction key is held in its uppermost position by a compression spring 121 acting against clip 120 and projection 122 of the key. Inserted in the shank of key 119 is a pin 123 adapted to abut projection 104 of lever 98 when the key is depressed, with the result that lever 98 cannot move and the touch bar assembly is locked.

It will be recalled that the starting box 88 operated a release device. This is shown in Figs. 3 and 4a. The starting button 89 has in it a groove in which seats a forked member 124 of the bent shape shown particularly in Fig. 4a and having an incline 125 and a level portion 126. Having a bearing in base 3 is a plunger 127 normally held against level portion 126 of the forked member by a compression spring 128. On the upper end of this plunger is a collar 129 and a slot 130. Into this slot fits one end of bar 131 which extends upwardly and is pivotally connected at 132 to the disabling lever 133. (Fig. 3). A further connection between the two is provided by the tension spring 134. The disabling lever 133 is pivoted to the frame of the machine at 135 and its outer end extends over and is in contact with the pin 137 of the full stroke pawl 138. This pawl is also pivoted to the frame at 139. The function of this pawl is to prevent the recovery of the machine by the drive springs 140 unless a full stroke is made; that is, unless the shaft 62 rotates through its full operating distance carrying the full stroke sector 118 with it. In the event of a short stroke, the end 142 of the pawl 138 will engage in the cuts 143 of the full stroke sector and no return movement is possible until end 142 of the pawl reaches and enters depression 144 of the sector. It is also at this point that the pawl is reversed so that the same procedure is followed as regards the recovery stroke until this pawl is reversed in a similar depression at the other end of the full stroke sector. The tension spring 145, acting between the full stroke pawl 138 and the frame, holds this pawl so that it rides against the sector 118 ready to lock into a cut if reversal of stroke is attempted before the full stroke is completed. This gives an adequate and effective lock against improper operation of the machine. Thus it will be seen that the push button 89 of the starting box, acting through the plunger 127, bar 131 and lever 133, can control the full stroke pawl 138 to the position shown in dotted lines.

As is customary, the adding machine has provision for manual operation. This I show in Figs. 3 and 11. On the main shaft 62 is the customary slotted hub 146 with pin 147. An operating handle such as 148 can be attached here, as is usual, and its inner edge is beveled as at 149. Pivoted at 150 within the machine (Fig. 3) is an interlocking lever having arms 151, 152 and 153; the arm 153 being attached to the tension spring 154. On arm 151 of this lever is a pointed pin 155 which is normally held close against the hub 146 by the said spring 154. In this position, arm 152 of the lever just clears collar 129 of plunger 127 in starting box 88. Therefore, button 89 is free to move. However, if the handle 148 is attached and as it is put on, the pin 155 on the interlocking lever will be forced away from the hub 146 by the action of the pointed part of the pin riding over the beveled edge 149 of the handle. Consequently, the interlocking lever will be moved about pivot 150 and arm 152 move to a position over collar 129 and the switch locked because plunger 127 cannot rise and button 89 is held immovable by forked member 124. Conversely, when the motor drive is used, handle 148 cannot be applied, for then button 89 of the staring box is pushed in, plunger 127 rides up over the incline 125 so that collar 129 is past the end of arm 152 of the interlocking lever and the pin 155 cannot move far enough away from hub 146 to allow the handle hub to pass and seat in the slot.

Having described the details of my invention in the preferred form which I have chosen for illustration, I will now set forth the way in which it operates.

The operating handle 148 is not in use, so that arm 152 of the interlocking lever (Fig. 3) stands away from plunger 127 of the starting box 88, so that button 89 may be pushed in to make contact between a source of current and the wiring of my device. By pushing in this button 89 the plunger 127 is caused to ride up over the incline 125 to the high portion of forked member 124 and remain there (Fig. 4a). Consequently, bar 131 (Fig. 3) is raised, causing the disabling lever 133 to hold the full stroke pawl 138 out of engagement with the full stroke sector 118, as shown in the dotted position. The motor drive being positive and constant, a full stroke will always result and this safety device becomes unnecessary. It will be understood from what has been said that the handle 148 cannot be attached while the starting button 89 is in.

When it is desired to operate, the touch bar 93 (Fig. 3) is depressed and the motion is trasmitted through the levers 98 and 107 to arm 114 of the bell crank. By virtue of arm 113 of this bell crank having a sliding contact with the roller stud 117 on the full stroke sector which is stationary at this time, the bell crank is caused to turn on its pivot 116 against the tension of its spring 115 and the final motion of arm 114 of the bell crank is diagonal; that is, downward and toward the rear of the machine. In this travel, arm 114 contacts with roller stud 75 on latch 74 and rocks it about pivot 73 so that the lip 76 is released from its seat in end 67 of bracket 65. Consequently, under the tension of spring 77 and flat spring 81, the shaft 68 is rocked, counterclockwise, Fig. 3, the arm 72 brought downward and contact made between the switch springs 82 and 83 by the insulated stud 80, and current flows to the motor. In this position, with the latch 74 tripped and shaft 68 rocked, the intermediate arm 71 is raised and arm 69 (Figs. 2 and 6) moves to the low portion of cam 36. Consequently, (Fig. 6) the clutch dog 27 engages with the toothed member 14 so that worm wheel 10 drives the shaft 11 and the cams 36 and 37 (Fig. 2). The rotation of the drive cam 37 rocks the drive lever 51 and its assembly about the pivot 50; the yielding drive arm 54 rocks the main shaft 62 through the restoring lever 61 and thus operates the adding machine or whatever my drive may be attached to. As the cam 37 revolves, roller 53 on the drive lever 51 comes again to the low portion of the cam 37 by virtue of the restoring action of the main spring 63 and the drive springs 140 (Fig. 3) acting on the shaft 62 through the full stroke sector 118.

Figure 5:
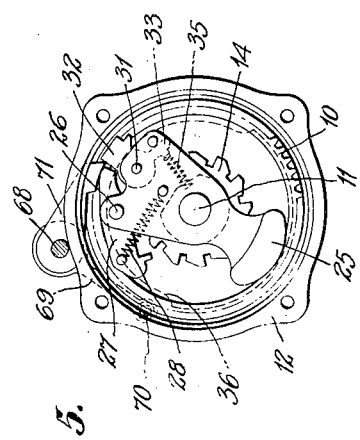
Figure 6:
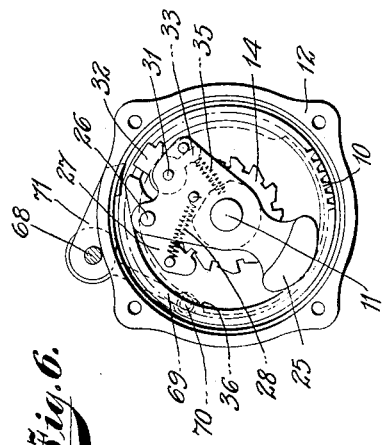

When the touch bar 93 is allowed to rise, the attached levers rise with it and arm 114 of the bell crank moves away from the latch 74 (Fig. 3); this latch still remaining disengaged from the end 67. Switch points 82 and 83 remain closed and the drive continues until cam 36 forces arm 69 up on its high portion. This results in rocking shaft 68 clockwise Fig. 3 to raise arm 72, switch points 82 and 83 separate to break the circuit, and latch 74 reengages with end 67. Simultaneously the intermediate lever 71 is depressed (Figs. 1, 3 and 5). It will be remembered that during the operation of driving the parts were in the relation shown in Fig. 6. Now, when the intermediate lever 71 is depressed by the rocking of shaft 68 and as shaft 11 continues to rotate, the clutch dog 27 will be brought in contact with lever 71 and released from the toothed member 14 (Fig. 5). Also the point of this lever will engage with and be retained by the catch 32, this catch moving about pivot 31 against the spring 35 to provide a degree of braking effect, so that the rotation of the arm 25 and all moving parts on shaft 11 are stopped; that is, the drive stops. At the same time, the toothed member 14 and the clutch dog 27 being no longer engaged, the worm wheel 10 revolves freely under the momentum of the motor, all other parts being at rest.

When the disengagement effected by the intermediate lever occurs, the arm 69 is again opposite the lower portion of cam 36 (Fig. 5). Consequently, there is opportunity for rebound and vibration in the driving parts, due to the abrupt stoppage. To overcome this, I provide the detent 42 (Fig. 2) as detailed previously, and which cooperates with the roller 40 between the cams, this roller revolving with these cams in a clockwise direction. It will be seen that this roller is placed a predetermined distance behind the point where the high portion of the cam 36 begins. Consequently, the drive, on the recovery stroke, travels a short distance on the momentum of the moving parts and this is so as the roller 40 nears the detent 42 in its rotation. Therefore, the curve 47 of the detent, under the action of the spring 46, acts as a brake on the moving parts and these are slowed down so that as roller 40 enters curve 48 of the detent, it is held there. Not only does this detent prevent rebound but also serves to position cam 36 with relation to cam follower 70 so that said cam follower can enter the low portion of the cam when the shaft 68 is tripped.

Figure 7:
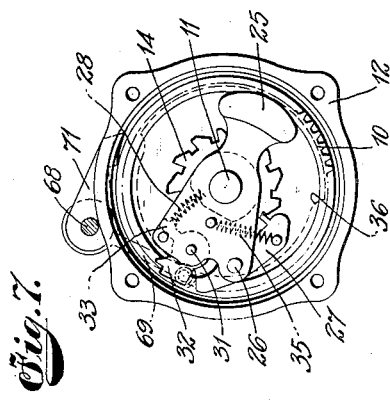
Figure 8:
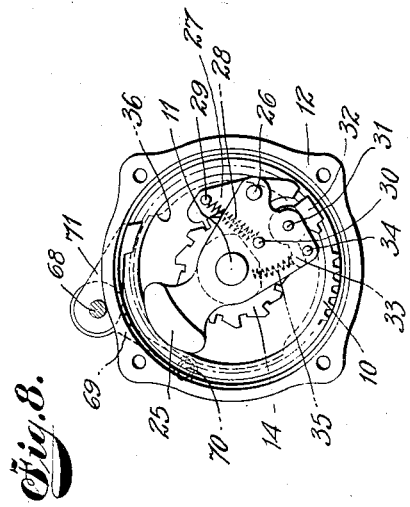

In Figs. 1, 2 and 3, the switch points 82 and 83 (Fig. 3) are open and the drive is at rest with the worm wheel assembly in the positions shown in Figs. 1 and 5, as is also the arm 69 and the cam 36. As the shaft 68 is rocked as a result of depressing touch bar 93, the parts take the position shown in Fig. 6 with arm 69 in the low part of cam 36, intermediate lever 71 raised out of catch 32, and clutch dog 27 engaged with toothed member 14. These are the driving positions. Fig. 7 shows the parts still in the driving positions, but somewhat advanced in rotation, and with the arm 69 still in the low portion of cam 36. In Fig. 8, the arm 69 has passed on to the high portion of the cam 36, thus rocking shaft 68 to open the circuit, set the latch 74 and depress the intermediate arm 71. Therefore, as rotation continues, due to the momentum of the motor, this arm will act and the parts again assume the at rest positions of Fig. 5.

It is clear that current is supplied to the motor only during the time that the arm 69 is on the low portion of cam 36 and that the current is off for that time that the arm 69 is on the high portion of the cam, so that, for one contact caused by a depression of the touch bar 93, the motor will drive through a part revolution of the cams 36 and 37 before being cut out and that the complete revolution of these cams will be made under the momentum of the motor before the parts are brought to rest and the mechanism reset by the assembly on the trip shaft 68 and the positioning action of the detent 42. As a result of the cam action just described, the drive arm 51 and its assembly will make one stroke and give a corresponding action to the adding machine mechanism. This series of operations will be performed each time that the touch bar 93 is depressed.

When it is desired that the machine operate continuously through a number of these cycles all that is necessary is to keep the touch bar 93 depressed. This holds the arm 114 in contact with the roller 75 so that when the cam follower 70 rides up on the high portion of cam 36, thereby rocking shaft 68 and opening the switch contacts 82 and 83, the roller 75 merely rides along the arm 114 without permitting the lip 76 to engage the arm 67. Immediately before the cam follower 70 leaves the high portion of the cam 36 at the end of each cycle the clutch dog 27 is disengaged from the clutch 17, but as the cam follower passes to the low portion of the cam 36 the shaft 68 is rocked counterclockwise and the dog 27 is immediately dropped or released by the raising of arm 71 to reengage clutch 14. The dog may not reenter the same tooth of the clutch but may drop back from one to two teeth. These cycles are repeated as long as the bar 93 remains depressed.

It is necessary in adding machines, or the like, to lock the machine against operation when the correction key is actuated, so that damage may not result. I accomplish this by an arrangement previously described, and which operates as follows. When the correction key 119 (Fig. 3) is depressed to clear the board, the pin 123 comes against the projection 104 of the lever 98, thus locking this lever against action so that touch bar 93 cannot be depressed to start the motor. This remains so as long as key 119 is held down, but when it is released and is moved upward by the spring 121, the mechanism is released and can be operated.

In describing my device with its associated parts which drive the adding machine mechanism, it is evident that a degree of inertia must be overcome at the initial starting of the motor. The load on the motor is taken up gradually and undue stresses prevented by the slip clutch shown in Figs. 9 and 10 as previously detailed and where worm wheel 10 is driven by the worm 9 (Fig 1) and in turn drives shaft 11 through the toothed member 14 engaging the clutch dog 27. When the clutch dog is out of engagement, the worm wheel 10 and the assembly shown in Figs. 9 and 10 will revolve freely on shaft 11. In this condition, lugs 15 and 16 of toothed member 14 will be pulled over against the sides of the respective cuts 17 and 18 in worm wheel 10 by the tension of spring 24. This is the idle position for these lugs. Now when the motor starts and the load comes on by the clutch dog 27 engaging toothed member 14, the lugs 15 and 16 take up the initial movement through friction clutch action of piece 19 and this acts until the lugs 15 and 16 slip over the open distance of the cuts 17 and 18 and abut against the other sides of these cuts and the drive then becomes positive. When the drive stops, the lugs are brought back to their initial position by the spring 24. In this manner I provide means of taking up lost motion in the moving parts and of greatly decreasing the shock of starting; a necessary provision in complicated mechanisms.

Where the operator of a machine jams it, or something occurs to suddenly prevent further operation, a safety device is necessary in the drive to prevent damage under such conditions. This I provide on the assembly of the drive lever 51 (Fig. 2). Under normal conditions, this assembly acts as a unit to drive the cam restoring lever 61. If for any reason a jam occurs, this lever will remain immovable but the drive continues. The yielding drive arm 54, abutting against lever 61 cannot move. Consequently, the drive arm 51, being forced rearward by the drive cam 37, the projection 57 of the safety dog 56 is forced out of its depression against the tension of the heavy spring 58 and rides up on the level portion of the drive arm 51. Therefore, the drive arm assembly is disabled without harm to either the drive or to the machine, and this action will continue until either the machine is released or the drive stopped.

In order that the motor or the motor and drive may be actuated by hand when so desired, I provide a knob 156 (Fig. 2) on the end of the motor shaft. This knob is so arranged that it is normally held outward and disengaged, but when pushed inward, engages with the motor shaft to turn the motor.

With my electric drive attached, manual operation of the adding machine may be accomplished as follows. (See Figs. 3 and 11); Current is shut off by pushing in button 90 of starting box 88 which brings button 89 and bent part 124 out so that plunger 127 drops with the bar 131 and the full stroke pawl 138 is released from the disabling lever 133 and is free to act. Likewise, the dropping of plunger 127 clears the way for arm 152 of the interlocking lever to swing over. Handle 148 is then slipped on over pin 147, engages with the slot in hub 146, and is locked there by a catch. As before described, the putting on of this handle forces pin 155 of the interlocking lever away from hub 146 so that this lever is moved about pivot 150 to bring arm 152 over collar 129 of plunger 127. Consequently, this plunger cannot rise, and the starting box is locked and the electric drive cannot be used as long as the machine is manually operated. By removing this lever, the interlocking lever releases the starting box but prevents the attachment of the handle. It will thus be seen that a positive arrangement is provided whereby only one method of operation may be used at a time.

It is clear that the type of motor used is of no material importance and may be adapted to the source of current available, or may be universal to take either direct or alternating current.

While I have set forth the idea of my invention in the foregoing, it is obvious that many changes and variations might be made without departing from the spirit of that invention, and I desire that my claims be interpreted in this light.

I claim:

1. In a drive for adding machines and the like, the combination with a motor, of a shaft driven by the motor, means on said shaft connected to operate the adding machine, a shock-absorbing clutch including a dog for connecting and disconnecting the motor and shaft, a cam on said shaft, a second shaft, an arm on said second shaft to directly engage said dog, and a second arm on said second shaft directly engaged and operated by the said cam to throw out the clutch.

2. In a drive for adding machines and the like, the combination with a motor, of a shaft driven by the motor, means on said shaft connected to operate the adding machine, a shock-absorbing clutch including a dog for connecting and disconnecting the motor and shaft, a cam on said shaft, a second shaft, an arm on said second shaft to directly engage said dog, a second arm on said second shaft directly engaged and operated by the said cam to throw out the clutch, a third arm on the second shaft, and a trip lever pivoted on the end of the said third arm having one end adapted to engage a stop to maintain the second shaft in such position as to cause the clutch to be inoperative.

3. In a drive for adding machines and the like, the combination with a motor, of a shaft driven by the motor, means on said shaft connected to operate the adding machine, a shock-absorbing clutch including a dog for connecting and disconnecting the motor and shaft, a cam on said shaft, a second shaft, an arm on said second shaft to directly engage said dog, a second arm on said second shaft directly engaged and operated by the said cam to throw out the clutch, a third arm on the second shaft, a trip lever pivoted on the end of the said third arm having one end adapted to engage a stop to maintain the second shaft in such position as to cause the clutch to be inoperative, pressure means to trip the trip lever and disengage it from its stop, and spring means to cause the trip lever to re-engage said stop.

4. In a drive for adding machines and the like, the combination with a motor, of a shaft driven by the motor, means on said shaft connected to operate the adding machine, a switch for the motor, a shock-absorbing clutch including a dog for connecting and disconnecting the motor and shaft, a cam on said shaft, a second shaft, an arm on said second shaft to directly engage said dog, a second arm on said second shaft directly engaged and operated by the said cam to throw out the clutch, a third arm on the second shaft, a trip lever pivoted on the end of the said third arm having one end adapted to engage a stop to maintain the second shaft in such position as to cause the clutch to be inoperative and a stud on the said third arm to engage and close the switch.

5. In combination with an adding machine, a motor, a shaft driven by the motor, an oscillatable member driven by the shaft and having a notch in one end thereof, an oscillatable arm pivoted coaxially with the said member and extending beyond the end thereof for transmitting power to the adding machine, a drive member pivoted on the arm adapted to engage said oscillatable member and having a projection normally seated in the notch of the oscillatable member, and spring means for normally holding the projection in the notch but permitting the projection to be disengaged from the notch when the adding machine jams.

In testimony whereof I have signed my name to this specification this 6th day of June, 1924.

NELSON WHITE.